United States Patent
Sishtla et al.

(10) Patent No.: US 11,499,767 B2
(45) Date of Patent: Nov. 15, 2022

(54) REVERSE ROTATION PREVENTION IN CENTRIFUGAL COMPRESSOR

(71) Applicant: CARRIER CORPORATION, Palm Beach Gardens, FL (US)

(72) Inventors: Vishnu M. Sishtla, Manlius, NY (US); Scott A. Nieforth, Clay, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/045,861

(22) PCT Filed: Apr. 8, 2019

(86) PCT No.: PCT/US2019/026308
§ 371 (c)(1),
(2) Date: Oct. 7, 2020

(87) PCT Pub. No.: WO2019/199662
PCT Pub. Date: Oct. 17, 2019

(65) Prior Publication Data
US 2021/0364209 A1   Nov. 25, 2021

Related U.S. Application Data

(60) Provisional application No. 62/655,020, filed on Apr. 9, 2018.

(51) Int. Cl.
*F25B 49/02*      (2006.01)
*F25B 31/02*      (2006.01)
(Continued)

(52) U.S. Cl.
CPC .......... *F25B 49/022* (2013.01); *F25B 31/026* (2013.01); *F25B 39/00* (2013.01);
(Continued)

(58) Field of Classification Search
CPC .............. F04D 27/001; F04D 27/0246; F04D 27/0261; F25B 31/026; F25B 49/022;
(Continued)

(56) References Cited

U.S. PATENT DOCUMENTS 4,071,306 A     1/1978  Calabretta
4,514,989 A *   5/1985  Mount ................. H02H 7/0816
                                                    62/201

(Continued)

FOREIGN PATENT DOCUMENTS

CN   201461404 U   5/2010
CN   103115022 B   5/2013

(Continued)

OTHER PUBLICATIONS

International Search Report Application No. PCT/US2019/026308, dated Jul. 2, 2019, pp. 5.

(Continued)

*Primary Examiner* — Jonathan Bradford
(74) *Attorney, Agent, or Firm* — Cantor Colburn LLP

(57) ABSTRACT

A method of operating a heat exchanger system in which a compressor, which is drivable by a motor, is fluidly interposed between an evaporator and a condenser following receipt of a shutdown command is provided. The method includes positioning inlet guide vanes (IGVs) of the compressor in a first position in the event of at least one of a first precondition being in effect and the first and a second precondition both not being in effect. The method further includes positioning the IGVs in a second position in an event the first precondition is not in effect but the second precondition is in effect, ramping a speed of the compressor down until a third precondition takes effect, removing power from the motor and positioning the IGVs in the first position once power is removed from the motor.

19 Claims, 2 Drawing Sheets

(51) Int. Cl.
*F25B 39/00* (2006.01)
*F04D 27/00* (2006.01)
*F04D 27/02* (2006.01)

(52) U.S. Cl.
CPC ........ *F04D 27/001* (2013.01); *F04D 27/0246* (2013.01); *F04D 27/0261* (2013.01); *F25B 2500/27* (2013.01); *F25B 2600/0253* (2013.01); *F25B 2600/2501* (2013.01); *F25B 2700/193* (2013.01); *F25B 2700/195* (2013.01)

(58) Field of Classification Search
CPC .......... F25B 2500/27; F25B 2600/0253; F25B 2600/2501; F25B 2700/193; F25B 2700/195
See application file for complete search history.

(56) References Cited

U.S. PATENT DOCUMENTS

| | | | |
|---|---|---|---|
| 4,539,820 A * | 9/1985 | Zinsmeyer | ............ F25B 49/022 62/201 |
| 4,589,060 A * | 5/1986 | Zinsmeyer | ............ F25B 49/022 702/33 |
| 4,762,469 A | 8/1988 | Tischer | |
| 4,840,545 A | 6/1989 | Moilanen | |
| 4,955,795 A | 9/1990 | Griffith | |
| 5,167,491 A * | 12/1992 | Keller, Jr. | ............. F25B 49/022 417/28 |
| 5,186,613 A | 2/1993 | Kotlarek et al. | |
| 5,591,014 A | 1/1997 | Wallis et al. | |
| 5,683,236 A | 11/1997 | Harrison et al. | |
| 5,800,141 A | 9/1998 | Ceylan et al. | |
| 5,820,349 A | 10/1998 | Caillat | |
| 6,042,344 A | 3/2000 | Lifson | |
| 6,095,764 A | 8/2000 | Shibamoto et al. | |
| 6,171,064 B1 | 1/2001 | Hugenroth et al. | |
| 6,190,138 B1 | 2/2001 | Hugenroth | |
| 6,203,300 B1 | 3/2001 | Williams et al. | |
| 6,210,119 B1 | 4/2001 | Lifson et al. | |
| 6,418,740 B1 | 7/2002 | Williams et al. | |
| 6,533,552 B2 | 3/2003 | Centers et al. | |
| 6,669,456 B2 | 12/2003 | Kim | |
| 6,672,845 B1 | 1/2004 | Kim et al. | |
| 6,893,236 B2 | 5/2005 | Jeong | |
| 7,121,813 B2 | 10/2006 | Choi et al. | |
| 7,160,088 B2 | 1/2007 | Peyton | |
| 7,197,890 B2 | 4/2007 | Taras et al. | |
| 7,290,990 B2 | 11/2007 | Lifson | |
| 7,300,257 B2 | 11/2007 | Lifson et al. | |
| 7,356,999 B2 | 4/2008 | Bodell, II et al. | |
| 7,429,167 B2 | 9/2008 | Bonear et al. | |
| 7,950,911 B2 | 5/2011 | Ohtsuka et al. | |
| 8,291,713 B2 * | 10/2012 | Matz | ......................... F02C 9/22 60/773 |
| 8,855,474 B2 | 10/2014 | Marchinkiewicz et al. | |
| 8,979,509 B2 | 3/2015 | Matsumoto et al. | |
| 9,816,742 B2 | 11/2017 | Rite et al. | |
| 10,544,791 B2 | 1/2020 | De | |
| 10,612,827 B2 | 4/2020 | Sibik | |
| 2014/0328667 A1 * | 11/2014 | Sommer | ............. F04D 27/0253 415/1 |
| 2015/0219378 A1 | 8/2015 | Crane et al. | |
| 2015/0362240 A1 * | 12/2015 | Sibik | ....................... F04B 49/08 62/115 |

FOREIGN PATENT DOCUMENTS

| | | |
|---|---|---|
| CN | 103321934 A | 9/2013 |
| CN | 103946555 A | 7/2014 |
| CN | 105074360 A | 11/2015 |
| EP | 0538179 A1 | 12/1995 |
| JP | 3267591 A | 7/2001 |
| KR | 20100083257 A | 7/2010 |
| WO | 2005035992 A2 | 4/2005 |
| WO | 2014074448 A1 | 5/2014 |
| WO | 2014106233 A1 | 7/2014 |

OTHER PUBLICATIONS

Written Opinion Application No. PCT/US2019/026308, dated Jul. 2, 2019, pp. 10.
Werner Soedel:, "Proceedings of the 1996 International Compressor Engineering Conference at Purdue"; Purdue University, West Lafayette, IN; vol. II; Jul. 23-26, 2996; pp. 8.
Office Action issued in Chinese Application No. 201980038590.8; Application Filing Date Apr. 8, 2019; dated Nov. 26, 2021 (16 pages).

* cited by examiner

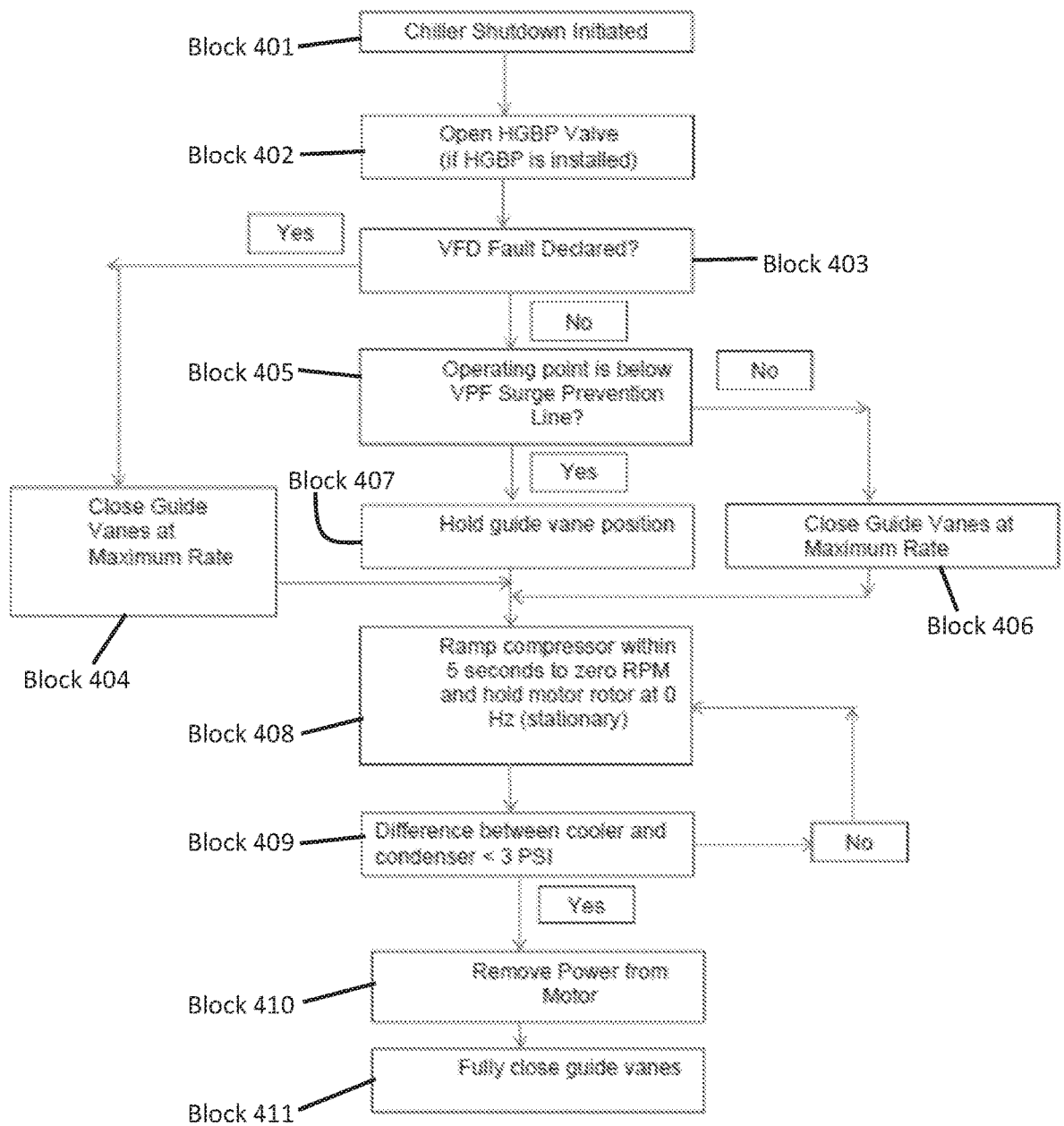

REVERSE ROTATION PREVENTION IN CENTRIFUGAL COMPRESSOR

CROSS-REFERENCE TO RELATED APPLICATIONS

This application is a National Phase of PCT Application No. PCT/US2019/026308 filed Apr. 8, 2019, which claims the benefit of Provisional Application 62/655,020 filed Apr. 9, 2018, the disclosure of which is incorporated herein by reference in its entirety.

BACKGROUND

The following description relates to systems with centrifugal compressors and, more specifically, to reverse rotation prevention in systems with centrifugal compressors.

Heat exchanger systems, such as a water-cooled chiller, typically include a compressor, an expansion valve, a condenser fluidly interposed between the compressor and the expansion valve and an evaporator fluidly interposed between the expansion valve and the compressor. The compressor compresses a saturated vapor and outputs a high-pressure and high-temperature superheated vapor to the condenser. The condenser causes the superheated vapor to condense and outputs the resulting condensed liquid to the expansion valve as a saturated liquid. The expansion valve abruptly reduces a pressure of the saturated liquid and produces a relatively cold mixture with liquid that is then evaporated in the evaporator. The resulting saturated vapor is returned to the compressor.

In water-cooled chillers, in particular, manual isolation valves are often used in discharge pipes between centrifugal compressors and condensers. When the units are shutdown, high pressure gas from the condenser flows through the compressor into the evaporator. After, a period of time (e.g., ~3 seconds), the compressor goes into reverse rotation before coming to a complete stop. For a compressor using rolling element bearings, such reverse rotation is not significantly problem whereas, for a compressor using magnetic bearings, reverse rotation can be an issue.

BRIEF DESCRIPTION

According to an aspect of the disclosure, a method of operating a heat exchanger system in which a compressor, which is drivable by a motor, is fluidly interposed between an evaporator and a condenser following receipt of a shutdown command is provided. The method includes positioning inlet guide vanes (IGVs) of the compressor in a first position in the event of at least one of a first precondition being in effect and the first and a second precondition both not being in effect. The method further includes positioning the IGVs in a second position in an event the first precondition is not in effect but the second precondition is in effect, ramping a speed of the compressor down until a third precondition takes effect, removing power from the motor and positioning the IGVs in the first position once power is removed from the motor.

In accordance with additional or alternative embodiments, opening a hot gas bypass (HGBP) valve immediately following receipt of the shutdown command.

In accordance with additional or alternative embodiments, the first precondition includes a variable frequency drive (VFD) fault being declared, the second precondition includes an operating point being greater than or equal to a VFD surge prevention line and the third precondition includes a pressure difference between the compressor and the condenser being less than a predefined amount.

In accordance with additional or alternative embodiments, the predefined amount is about 3 PSI.

In accordance with additional or alternative embodiments, the first position is a fully closed position of the IGVs.

In accordance with additional or alternative embodiments, the ramping of the speed of the compressor down includes ramping the speed of the compressor down to 0 RPM within a predefined time.

According to an aspect of the disclosure, a controller to operate a heat exchanger system following receipt of a shutdown command is provided. The controller is configured to position inlet guide vanes (IGVs) of a compressor in a first position in the event of at least one of a first precondition being in effect and the first and a second precondition both not being in effect, position the IGVs in a second position in an event the first precondition is not in effect but the second precondition is in effect, ramp a speed of the compressor down until a third precondition takes effect, remove power from a motor configured to drive the compressor and position the IGVs in the first position once power is removed from the motor.

In accordance with additional or alternative embodiments, the controller is further configured to open a hot gas bypass (HGBP) valve immediately following receipt of the shutdown command.

In accordance with additional or alternative embodiments, the first precondition includes a variable frequency drive (VFD) fault being declared, the second precondition includes an operating point being greater than or equal to a VFD surge prevention line and the third precondition includes a pressure difference between the compressor and the condenser being less than a predefined amount.

In accordance with additional or alternative embodiments, the predefined amount is about 3 PSI.

In accordance with additional or alternative embodiments, the first position includes a fully closed position of the IGVs.

In accordance with additional or alternative embodiments, the controller is configured to ramp the speed of the compressor down to 0 RPM within a predefined time.

According to an aspect of the disclosure, a controller of a heat exchanger system is provided. The heat exchanger system includes a compressor including inlet guide vanes (IGVs) at an inlet thereof, a motor configured to drive the compressor and a controller. The controller is configured to control the compressor, the IGVs and the motor and, upon receipt of a shutdown command, positions the IGVs in a first position in the event of at least one of a first precondition being in effect and the first and a second precondition both not being in effect, positions the IGVs in a second position in an event the first precondition is not in effect but the second precondition is in effect, ramps a speed of the compressor down until a third precondition takes effect, removes power from the motor and positions the IGVs in the first position once power is removed from the motor.

In accordance with additional or alternative embodiments, the heat exchanger system further includes an evaporator and a condenser and the compressor is fluidly interposed between the evaporator and the condenser.

In accordance with additional or alternative embodiments, the heat exchanger system further includes a hot gas bypass (HGBP) valve downstream from the compressor, interposed between the evaporator and the condenser, and the controller opens the HGBP valve immediately following the receipt of the shutdown command.

In accordance with additional or alternative embodiments, the first precondition includes a variable frequency drive (VFD) fault being declared, the second precondition includes an operating point being greater than or equal to a VFD surge prevention line and the third precondition includes a pressure difference between the compressor and the condenser being less than a predefined amount.

In accordance with additional or alternative embodiments, the predefined amount is about 3 PSI.

In accordance with additional or alternative embodiments, the first position is a fully closed position of the IGVs.

In accordance with additional or alternative embodiments, the controller ramps the speed of the compressor down to 0 RPM within a predefined time.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 4 is a flow diagram illustrating a method of operating the heat exchanger system of FIG. 1 in accordance with embodiments.

These and other advantages and features will become more apparent from the following description taken in conjunction with the drawings.

DETAILED DESCRIPTION

As will be described below, a control algorithm is proposed for use with water-cooled chillers, in particular, to prevent reverse rotation of the compressor following unit shutdown. The control algorithm generally opens inlet guide vanes (IGVs) of the compressor and a hot gas bypass valve (HGBP) when a shutdown command is provided and received. In addition, a monitoring unit monitors condenser and evaporator pressures so that compressor rotational speed can be held at zero until equalization.

Figure 1:
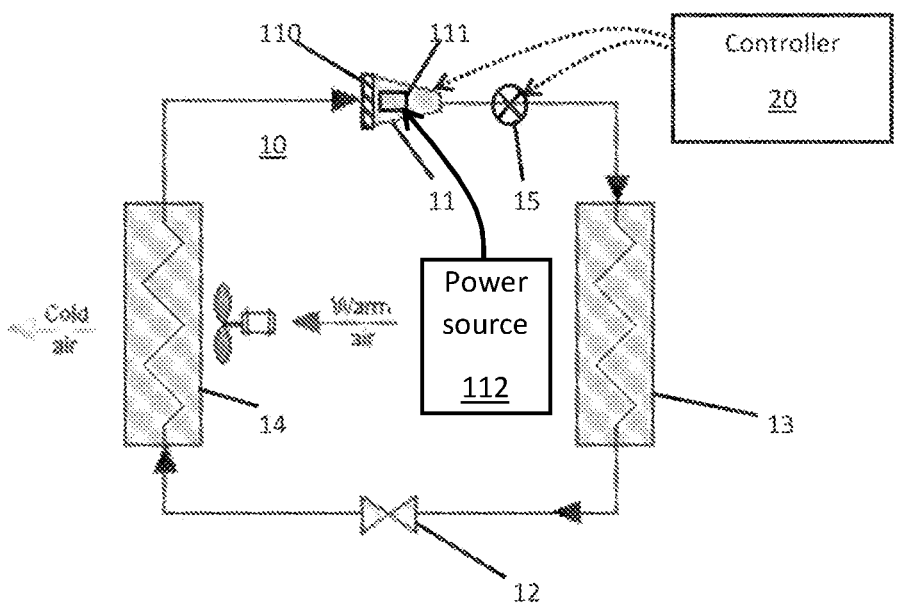
FIG. 1 is a schematic diagram of a heat exchanger system in accordance with embodiments.

With reference to FIG. 1, a heat exchanger system 10 is provided. The heat exchanger system 10 includes a compressor 11, an expansion valve 12, a condenser 13 fluidly interposed between the compressor 11 and the expansion valve 12 and an evaporator 14 fluidly interposed between the expansion valve 12 and the compressor 11. The compressor 11 is operable to compress a saturated vapor therein and to output a high-pressure and high-temperature superheated vapor toward the condenser 13. The condenser 13 causes the superheated vapor received from the compressor 11 to condense through thermal transfer with water, for example. The condenser 13 outputs the resulting condensed liquid toward the expansion valve 12 as a saturated liquid. The expansion valve 12 abruptly reduced a pressure of the saturated liquid and produces a relatively cold mixture. The liquid of this cold mixture is then evaporated in the evaporator 14 through thermal interactions with warm air blown over the evaporator 14 and the resulting saturated vapor is returned to the compressor 11 by way of inlet guide vanes (IGVs) 110 of the compressor 11.

The compressor 11 may include or be provided as a centrifugal compressor that operates by compressing fluids as a result of a rotation of the compressor 11 about a longitudinal axis thereof. Such rotation can be driven in part by motor 111, which is powered by power source 112.

The IGVs 110 of the compressor 11 are provided at an inlet of the compressor 11 and can assume various angular positions, which are referred to herein as IGV positions, and which include fully closed positions and multiple open positions. When the IGVs 110 assume the fully closed positions, the compressor 11 does not receive saturated vapor from the evaporator 14. By contrast, when the IGVs assume any of the open positions, the compressor 11 is receptive of the saturated vapor from the evaporator 14 in an amount which is related to how open the IGVs 110 are.

When the IGVs 110 assume one of the open positions, the IGVs 110 can be closed or opened at a rate that is reflective of a need for the compressor 11 to decrease or increase the amount of saturated vapor it can receive. In addition, the IGVs 110 can be closed to the fully closed position at a maximum closure rate in some cases.

As shown in FIG. 1, the heat exchanger system 10 may also include a hot gas bypass (HGBP) valve 15 and a controller 20. The HGBP valve 15 is fluidly interposed between the evaporator 14 and the condenser 13 and serves to moderate an amount of the high-pressure and high-temperature superheated vapor that is output from the compressor 11 to the condenser 13 by directing a portion of the high-pressure and high-temperature superheated vapor to another component (e.g., a distributer of the evaporator 14 by way of a check valve).

Figure 2:
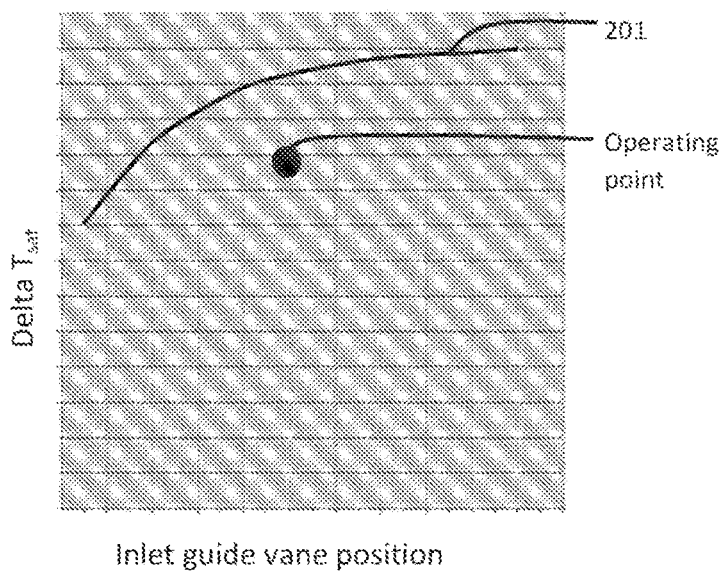
FIG. 2 is a graphical depiction of a surge prevention line for determining a condition of the heat exchanger system of FIG. 1.

With reference to FIG. 2, a graphical depiction of a variable primary flow (VPF) surge prevention line 201 can be plotted relative to a temperature change of the saturated vapor in the compressor 11 (delta $T_{sat}$) and IGV positions in terms of angles of the IGVs 110. The graphical depiction indicates that the heat exchanger system 10 or, more particularly, the compressor 11 can operate above or below the VPF surge prevention line 201.

Figure 3:
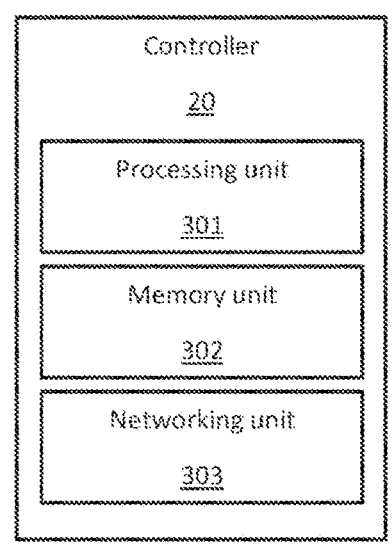
FIG. 3 is a schematic diagram illustrating a controller of the heat exchanger system of FIG. 1 in accordance with embodiments.

With reference back to FIG. 1 and with additional reference to FIG. 3, the controller 20 is operably coupled to at least the IGVs 110, the motor 111, the power source 112 and the HGBP valve 15 and is configured to control various operations of each of these components as described herein. The controller 20 may include a processing unit 301, a memory unit 302 and a networking unit 303, which is communicative with the IGVs 110, the motor 111, the power source 112 and the HGBP 15. The memory unit 302 has executable instructions stored thereon, which are readable and executable by the processing unit 301. When the executable instructions are read and executed by the processing unit 301, the executable instructions cause the processing unit 301 to operate as described herein.

With reference to FIG. 4, a method of operating the heat exchanger system 10 of FIG. 1 with the controller 20 is provided. As shown in FIG. 4, method includes receiving a shutdown command (block 401), opening the HGBP valve 15 if the HGBP valve 15 is installed (block 402) and determining whether a first precondition is in effect (block 403). In accordance with embodiments, the first precondition may include or be provided as the VFD fault being in effect and thus declared. In an event the first precondition is determined to be in effect (e.g., the VFD fault is in effect and has been declared), the method further includes closing the IGVs 110 at the maximum rate (block 404).

In accordance with embodiments, the shutdown command may be received in block 401 from an operator or a high level control element in response to a variable frequency drive (VFD) being in effect, for example. More particularly, the shutdown command may be generated and received from a building control system (based on a load requirement), a chiller control system (e.g., as part of operations for monitoring freeze protection, surges, motor winding temperatures, oil pressures, bearing temperatures, high compressor discharge temperatures, etc.), a VFD alarm and a bearing controller alarm.

In an event the first precondition is not in effect (e.g., the VFD fault is not in effect and has not been declared), the method includes determining whether a second precondition is in effect (block 405). In accordance with embodiments, the second precondition may include or be provided as an operating point of the heat exchanger system 10 or the compressor 11 being less than or below the VPF surge prevention line 201. In an event the second precondition is determined to not be in effect (e.g., the operating point of the heat exchanger system 10 or the compressor 11 is greater than or equal to the VPF surge prevention line 201), the method further includes closing the IGVs 110 at the maximum rate (block 406). Alternatively, in an event the second precondition is determined to be in effect (e.g., the operating point of the heat exchanger system 10 or the compressor 11 is below the VPF surge prevention line 201), the method further includes holding a position of the IGVs 110 (block 407).

At this point, the method also includes ramping a speed of the compressor 11 down to zero RPM within a given time (block 408), determining whether a third precondition is in effect (block 409), removing power from the motor 111 in an event the third precondition is determined to be in effect (block 410) and closing the IGVs 110 once the power is removed (block 411). In accordance with embodiments, the given time may be about five seconds and the third precondition may include or be provided as a cooler-condenser pressure difference being less than a given pressure (e.g., about 3 PSI).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of operating a heat exchanger system in which a compressor, which is drivable by a motor, is fluidly interposed between an evaporator and a condenser, the method comprising following receipt of a shutdown command:
    determining that a first precondition is not in effect;
    determining whether a second precondition is in effect;
    in response to determining that the first and second preconditions are both not in effect:
        closing inlet guide vanes (IGVs) of the compressor at a maximum rate so that the IGVs occupy a first position; and
    in response to determining that the first precondition is not in effect and the second precondition is in effect:
        holding the IGVs in a second position;
        ramping a speed of the compressor down until a third precondition takes effect;
        removing power from the motor; and
        closing the IGVs once power is removed from the motor.

2. The method according to claim 1, further comprising opening a hot gas bypass (HGBP) valve immediately following receipt of the shutdown command.

3. The method according to claim 1, wherein:
    the first precondition comprises a variable frequency drive (VFD) fault being declared,
    the second precondition comprises an operating point being less than a VFD surge prevention line, and
    the third precondition comprises a pressure difference between the compressor and the condenser being less than a predefined amount.

4. The method according to claim 3, wherein the predefined amount is about 3 PSI.

5. The method according to claim 3, wherein the first position comprises a fully closed position of the IGVs.

6. The method according to claim 3, wherein the ramping of the speed of the compressor down comprises ramping the speed of the compressor down to 0 RPM within a predefined time.

7. A controller to operate a heat exchanger system following receipt of a shutdown command, the controller being configured to:
    close inlet guide vanes (IGVs) of a compressor at a maximum rate so that the IGVs occupy a first position in the event of first and second preconditions both not being in effect;
    hold the IGVs in a second position in an event the first precondition is not in effect but the second precondition is in effect;
    ramp a speed of the compressor down until a third precondition takes effect;
    remove power from a motor configured to drive the compressor; and
    close the IGVs once power is removed from the motor.

8. The controller according to claim 7, wherein the controller is further configured to open a hot gas bypass (HGBP) valve immediately following receipt of the shutdown command.

9. The controller according to claim 7, wherein:
    the first precondition comprises a variable frequency drive (VFD) fault being declared,
    the second precondition comprises an operating point being less than a VFD surge prevention line, and
    the third precondition comprises a pressure difference between the compressor and the condenser being less than a predefined amount.

10. The controller according to claim 9, wherein the predefined amount is about 3 PSI.

11. The controller according to claim 9, wherein the first position comprises a fully closed position of the IGVs.

12. The controller according to claim 9, wherein the controller is configured to ramp the speed of the compressor down to 0 RPM within a predefined time.

13. A heat exchanger system, comprising:
    a compressor comprising inlet guide vanes (IGVs) at an inlet thereof;
    a motor configured to drive the compressor; and a controller, wherein the controller is configured to control the compressor, the IGVs and the motor and, upon receipt of a shutdown command, closes the IGVs at a maximum rate so that the IGVs occupy a first position in the event of first and second preconditions both not being in effect, holds the IGVs in a second position in an event the first precondition is not in effect but the second precondition is in effect, ramps a speed of the compressor down until a third precondition takes effect, removes power from the motor and closes the IGVs once power is removed from the motor.

14. The heat exchanger system according to claim 13, further comprising an evaporator and a condenser, wherein the compressor is interposed between the evaporator and the condenser.

15. The heat exchanger system according to claim 14, further comprising a hot gas bypass (HGBP) valve downstream from the compressor, interposed between the evaporator and the condenser, wherein the controller opens the HGBP valve immediately following the receipt of the shutdown command.

16. The heat exchanger system according to claim 13, wherein:
the first precondition comprises a variable frequency drive (VFD) fault being declared,
the second precondition comprises an operating point being less than a VFD surge prevention line, and
the third precondition comprises a pressure difference between the compressor and the condenser being less than a predefined amount.

17. The heat exchanger system according to claim 13, wherein the predefined amount is about 3 PSI.

18. The heat exchanger system according to claim 13, wherein the first position comprises a fully closed position of the IGVs.

19. The heat exchanger system according to claim 13, wherein the controller ramps the speed of the compressor down to 0 RPM within a predefined time.

* * * * *